(12) United States Patent
Ooi (10) Patent No.: US 9,294,024 B2
(45) Date of Patent: Mar. 22, 2016

(54) MOTOR DRIVE DEVICE HAVING FUNCTION OF DETECTING ABNORMALITY OF DC LINK UNIT

(71) Applicant: Fanuc Corporation, Yamanashi (JP)

(72) Inventor: Youichirou Ooi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/256,537

(22) Filed: Apr. 18, 2014

(65) Prior Publication Data

US 2014/0312822 A1 Oct. 23, 2014

(30) Foreign Application Priority Data

Apr. 22, 2013 (JP) ................. 2013-089674

(51) Int. Cl.
| | |
|---|---|
| *H02P 7/00* | (2006.01) |
| *H02P 27/06* | (2006.01) |
| *H02P 29/02* | (2006.01) |
| *H02H 11/00* | (2006.01) |

(Continued)

(52) U.S. Cl.
CPC .............. *H02P 7/00* (2013.01); *H02H 11/005* (2013.01); *H02H 11/006* (2013.01); *H02P 27/06* (2013.01); *H02P 29/022* (2013.01); *H02H 7/1213* (2013.01); *H02H 7/1227* (2013.01)

(58) Field of Classification Search
CPC .............. Y02T 10/642; Y02T 10/6217; Y02T 10/7216; Y02T 10/725; Y02T 10/7077; Y02T 10/7258; Y02T 70/5236; Y02T 90/16; G01R 31/42; G01R 31/028; G01R 29/16; G01R 31/343; G01R 31/40; H02H 3/162
USPC .................. 318/380, 400.3, 400.26, 490, 803
See application file for complete search history.

(56) References Cited

U.S. PATENT DOCUMENTS

| | | | |
|---|---|---|---|
| 5,430,636 A | 7/1995 | Kachi | |
| 7,106,023 B2 * | 9/2006 | Ota et al. | ........................ 318/803 |
| 7,250,794 B2 * | 7/2007 | Franke et al. | .............. 318/400.3 |

(Continued)

FOREIGN PATENT DOCUMENTS

| | | |
|---|---|---|
| CN | 2935619 | 8/2007 |
| CN | 102624324 | 8/2012 |

(Continued)

OTHER PUBLICATIONS

Partial Translation of Japanese Office Action dated Aug. 26, 2014.

*Primary Examiner* — Paul Ip
(74) *Attorney, Agent, or Firm* — RatnerPrestia (57) ABSTRACT

A motor drive device according to one embodiment of the present invention includes a converter (2) for converting an AC voltage input from a main power supply into a DC voltage, a DC link unit (4) for rectifying the DC voltage output from the converter, an inverter (10) for converting the DC voltage rectified by the DC link unit into an AC voltage for driving a motor using a semiconductor switching element, a voltage application unit (6) that is provided independently of the main power supply to apply a voltage to the DC link unit, a voltage detector (7) for detecting a voltage of the DC link unit after application of the voltage by the voltage application unit, and an abnormality determination unit (8) for determining the presence or absence of an abnormality of the DC link unit based on the voltage detected by the voltage detector.

4 Claims, 8 Drawing Sheets

(51) Int. Cl.
*H02H 7/12* (2006.01)
*H02H 7/122* (2006.01)

(56) References Cited

U.S. PATENT DOCUMENTS

| | | | |
|---|---|---|---|
| 7,906,922 B2* | 3/2011 | Thunes et al. | 318/375 |
| 8,023,234 B2* | 9/2011 | Andersen | 361/42 |
| 8,212,507 B2* | 7/2012 | Wystup et al. | 318/400.3 |
| 8,400,100 B2* | 3/2013 | Takizawa et al. | 318/803 |
| 8,796,982 B2* | 8/2014 | Li | 318/706 |
| 2005/0041443 A1* | 2/2005 | Franke et al. | 363/55 |
| 2006/0066283 A1* | 3/2006 | Ota et al. | 318/803 |
| 2008/0129238 A1* | 6/2008 | Andersen | 318/565 |
| 2008/0284369 A1* | 11/2008 | Jones et al. | 318/722 |
| 2009/0251081 A1* | 10/2009 | Thunes et al. | 318/375 |
| 2010/0066280 A1* | 3/2010 | Marchand et al. | 318/380 |
| 2010/0066294 A1* | 3/2010 | Hendrickson et al. | 318/490 |
| 2010/0066400 A1* | 3/2010 | Hendrickson et al. | 324/765 |
| 2010/0315027 A1* | 12/2010 | Wystup et al. | 318/400.3 |
| 2011/0012543 A1* | 1/2011 | Takizawa et al. | 318/139 |
| 2011/0043150 A1* | 2/2011 | Ogawa et al. | 318/400.26 |
| 2011/0249368 A1* | 10/2011 | Andersen | 361/23 |
| 2013/0155729 A1* | 6/2013 | Lee | 363/37 |
| 2014/0132295 A1 | 5/2014 | Xiao | |

FOREIGN PATENT DOCUMENTS

| | | |
|---|---|---|
| DE | 10 2009 011 254 A1 | 9/2010 |
| JP | 4-331473 | 11/1992 |
| JP | 05-336759 | 12/1993 |

\* cited by examiner

FIG. 1

PRIOR ART

MOTOR DRIVE DEVICE HAVING FUNCTION OF DETECTING ABNORMALITY OF DC LINK UNIT

CROSS-REFERENCE TO RELATED APPLICATIONS

This application is a new U.S. patent application that claims benefit of JP 2013-089674, filed on Apr. 22, 2013, the entire content of JP 2013-089674is hereby incorporated by reference.

FIELD OF THE INVENTION

The present invention relates to a motor drive device and, more particularly, to a motor drive device having a function of detecting the presence or absence of an abnormality of a DC link unit.

BACKGROUND OF THE INVENTION

As a method for driving a motor using a motor drive device, there is a known method for driving a motor, in which an AC voltage input from a main power supply is converted into a DC voltage using a converter and then this DC voltage is converted into an AC voltage using an inverter. Further, to smooth a DC voltage output from the converter, a DC link unit including a smoothing capacitor and others is provided. During an abnormality in the DC link unit, when AC power is applied to the converter from the main power supply, there is a possibility that the inverter may be damaged. When, for example, power of the main power supply is applied during short-circuit of the DC link unit, large current flows into the inverter, resulting in a risk that the motor drive device may be broken. Therefore, it is important to detect the presence or absence of an abnormality of the DC link unit before AC power from the main power supply is applied to the converter.

Figure 1:
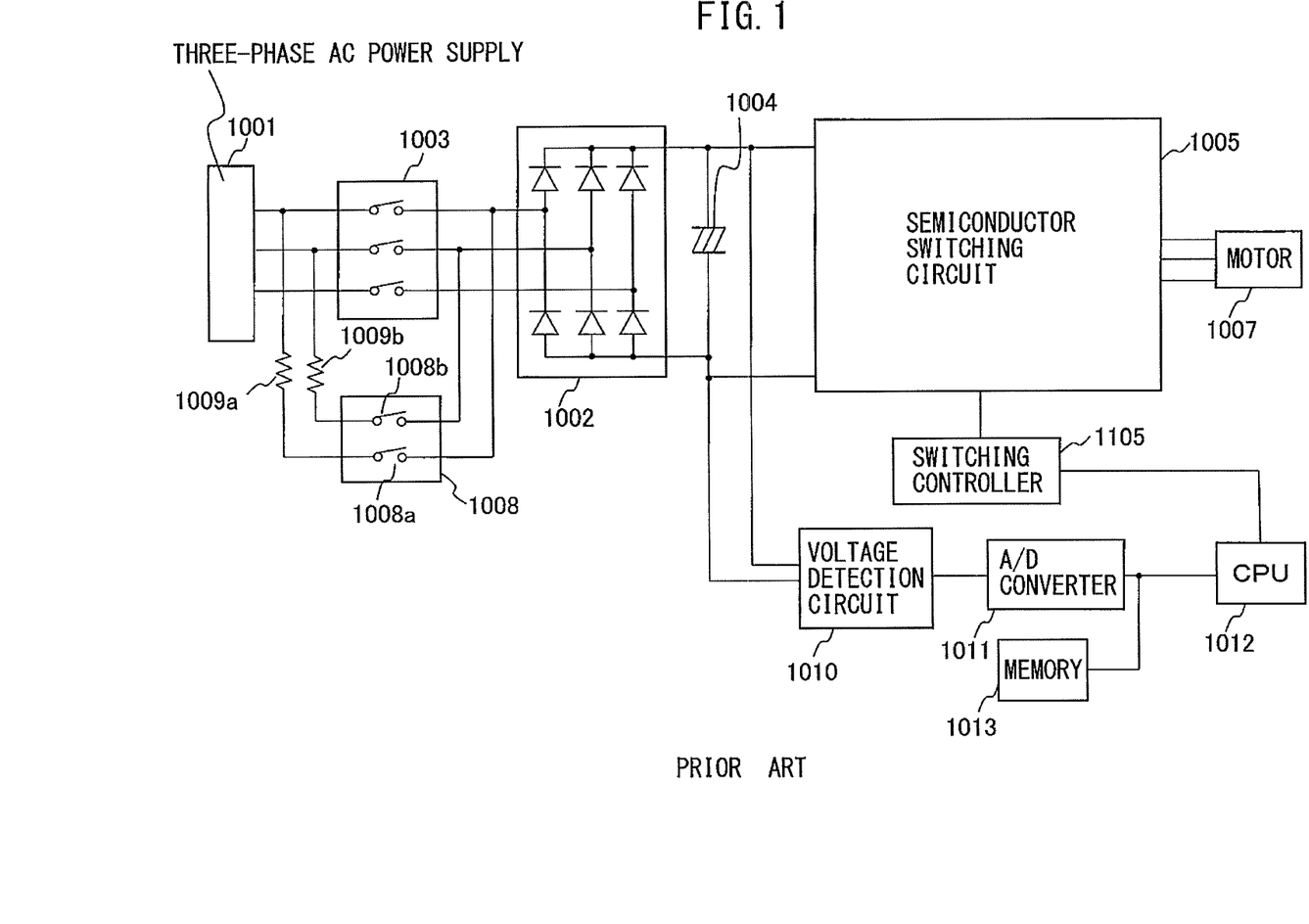
FIG. 1 is a configuration diagram of a conventional motor drive device.

Heretofore, a motor drive device for detecting the presence or absence of an abnormality of a DC link unit has been disclosed (for example, refer to Japanese Unexamined Patent Application Publication No. 5-336759 (JP-A-5-336759)). FIG. 1 illustrates a configuration diagram of a conventional motor drive device. The conventional motor drive device includes a converter 1002 for rectifying an AC voltage to be input, smoothing means 1004 that is charged with an output voltage rectified by this converter 1002 to smooth the output voltage, current limiting means 1009a and 1009b for limiting a magnitude of charging current of this smoothing means 1004, an inverter 1005 using a semiconductor switching circuit for feeding an AC voltage to a load by PWM control of an output voltage of the smoothing means 1004, a voltage detection circuit 1010 for detecting a voltage of both ends of the smoothing means 1004, and determination means 1012 using a CPU for determining normality or abnormality based on whether an output voltage of this voltage detection circuit 1010 is larger or smaller than a predetermined voltage. In the conventional motor drive device, as illustrated in FIG. 1, a voltage has been applied from a main power supply 1001 to the smoothing means 1004 that is a DC link unit via the resistors 1009a and 1009b to detect the presence or absence of an abnormality based on a increasing speed of the voltage.

However, the conventional motor drive device is applied with a large voltage from the main power supply 1001 and therefore it has been necessary to allow a resistor to have large normal rated power and to be expensive and large in size.

SUMMARY OF THE INVENTION

A motor drive device according to one embodiment of present invention includes a converter for converting an AC voltage input from a main power supply into a DC voltage, a DC link unit for rectifying the DC voltage output from the converter, an inverter for converting the DC voltage rectified by the DC link unit into an AC voltage for driving a motor using a semiconductor switching element, a voltage application unit that is provided independently of the main power supply to apply a voltage to the DC link unit, a voltage detector for detecting a voltage of the DC link unit after application of the voltage by the voltage application unit, and an abnormality determination unit for determining the presence or absence of an abnormality of the DC link unit based on the voltage detected by the voltage detector.

According to the present invention, with no use of an expensive resistor, it is possible to confirm that no abnormality occurs in a DC link unit without applying power of a main power supply to the DC link unit and therefore, power of the main power supply can be safely applied to a motor drive device. Further, in addition to the fact that no abnormality occurs in the DC link unit, it is possible to confirm that no abnormality occurs in a switching element and no abnormality such as interphase short circuit and the like occurs, and therefore, power of the main power supply can be more safely applied to the motor drive device. Therefore, even when an abnormality occurs in a DC link unit or a switching element configuring an inverter, it is possible to prevent breakage of a motor drive device, a power supply facility, and the like due to power activation.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The motor drive device according to the present invention will now be described with reference to the drawings. However, note that the technical scope of the present invention is not limited to the embodiments and covers the invention described in the appended claims and equivalents thereof.

First Embodiment

Figure 2:
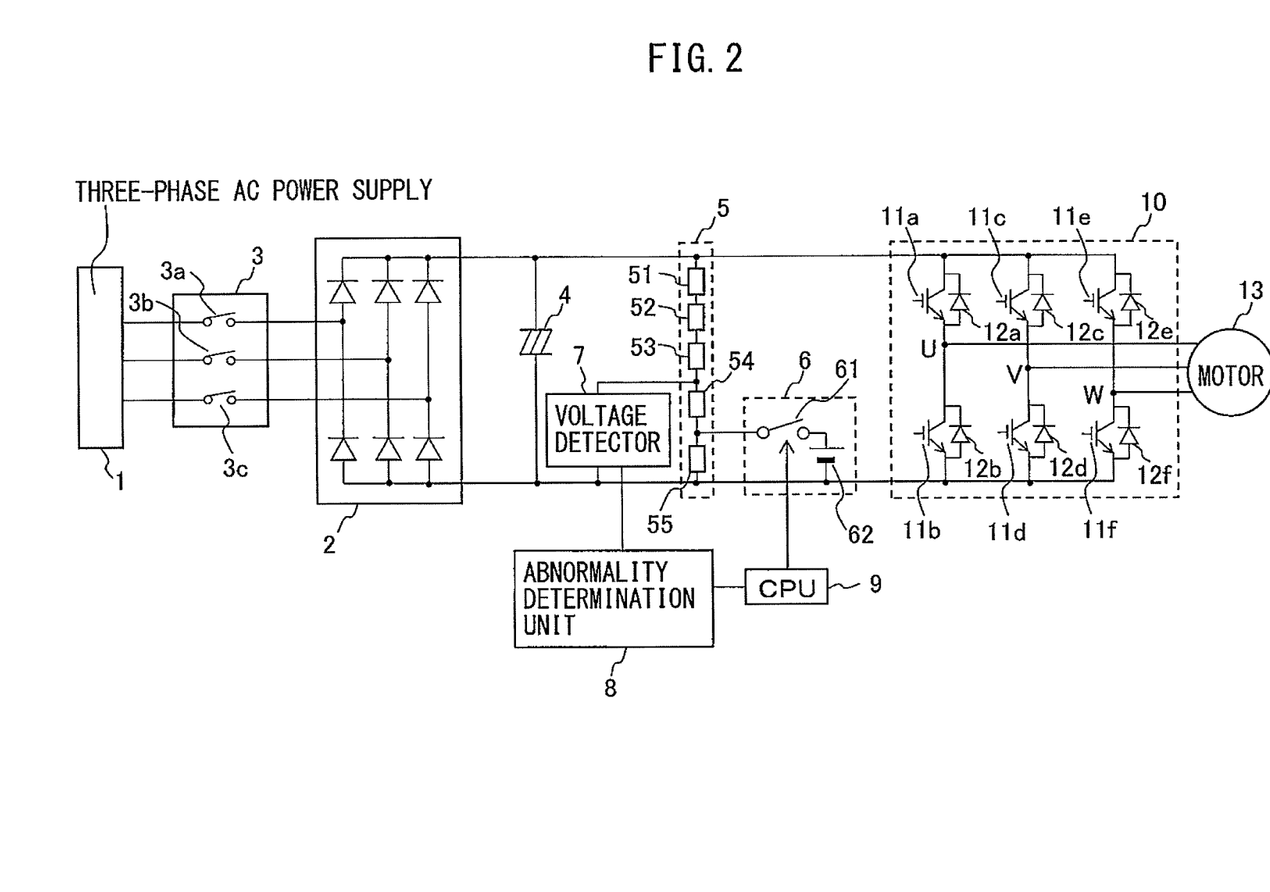
FIG. 2 is a configuration diagram of a motor drive device according to a first embodiment of the present invention.

Next, the motor drive device according to a first embodiment of the present invention will be described below. FIG. 2 illustrates a configuration diagram of the motor drive device according to the first embodiment of the present invention. The motor drive device according to the first embodiment of the present invention includes a converter 2 for converting an AC voltage input from a main power supply 1 into a DC voltage, a DC link unit 4 for rectifying a DC voltage output from the converter 2, an inverter 10 for converting a DC voltage rectified by the DC link unit 4 into an AC voltage for driving a motor using a semiconductor switching element, a voltage application unit 6 provided independently of the main power supply 1 to apply a voltage to the DC link unit 4, a voltage detector 7 for detecting a voltage of the DC link unit 4 after application of the voltage by the voltage application unit 6, and an abnormality determination unit 8 for determining the presence or absence of an abnormality of the DC link unit 4 based on the voltage detected by the voltage detector 7.

The main power supply 1 is a three-phase AC power supply and an AC voltage output from the main power supply 1 is applied to the converter 2 via a main power supply side switch 3. In the present invention, to detect the presence or absence of an abnormality of the DC link unit 4 before applying an AC voltage from the main power supply 1 to the converter 2, the main power supply side switch 3 is held open until the presence or absence of an abnormality of the DC link unit 4 is confirmed. The main power supply side switch 3 includes a first switch 3a, a second switch 3b, and a third switch 3c each corresponding to one of the phases of the three-phase AC power supply.

The converter 2 converts a three-phase AC voltage input from the main power supply 1 into a DC voltage. FIG. 2 illustrates an example where six diodes configure a three-phase full wave rectifying circuit.

The DC link unit 4 is provided to rectify a DC voltage output from the converter 2. As the DC link unit 4, for example, a smoothing capacitor is usable.

A resistor 5 is disposed at both ends of the DC link unit 4. The resistor 5 may be configured by connecting a plurality of resistors in series, and the present embodiment illustrates an example where the resistor 5 is configured of five resistors of a first resistor 51 to a fifth resistor 55. The number of resistors configuring the resistor 5 is not limited to five but may be one or at least two.

A part of the resistors of a resistor string configuring the resistor 5 is provided with a voltage application unit 6 for applying a voltage to the DC link unit 4, independently of the main power supply 1. FIG. 2 illustrates an example where the voltage application unit 6 is connected to both ends of the fifth resistor 55, but with no limitation to such a configuration, a connection may be made to any one of the resistors configuring the resistor 5. The voltage application unit 6 includes a switch 61 and a DC power supply 62. The switch 61 is turned on only when a voltage is applied to the DC link unit 4. Further, a CPU 9 controls ON/OFF of the switch 61. The switch 61 may be configured of an element capable of making switching such as a relay, a semiconductor element, and the like. The DC power supply 62 is provided independently of the main power supply 1 and is able to apply a DC voltage to the DC link unit 4 without inputting power from the main power supply 1 to the converter 2.

The resistor 5 includes the voltage detector 7 for detecting a voltage of the DC link unit 4 after voltage application by the voltage application unit 6. FIG. 2 has illustrated an example where the voltage detector 7 is connected to both ends of a set of the fourth resistor 54 and the fifth resistor 55, but with no limitation to such an example, a connection may be made to both ends of any one or more of the resistors allowing a voltage of both ends of the DC link unit 4 to be detectable. The voltage detector 7 includes an A/D converter (not shown) for digitizing a voltage of the DC link unit 4 to detect a voltage change by digital signal processing. A voltage of the DC link unit 4 detected by the voltage detector 7 is output to the abnormality determination unit 8.

Figure 3:
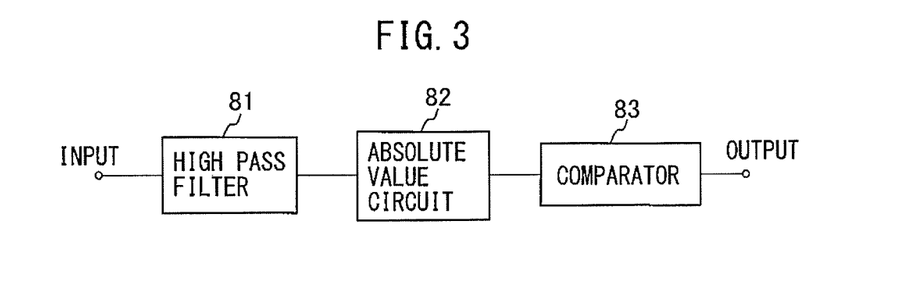
FIG. 3 is a configuration diagram of an abnormality determination unit configuring the motor drive device according to the first embodiment of the present invention.

The abnormality determination unit 8 determines the presence or absence of an abnormality of the DC link unit 4 based on the voltage detected by the voltage detector 7. The abnormality determination unit 8 may include, for example, a high pass filter 81, an absolute value circuit 82, and a comparator 83 as illustrated in FIG. 3. Use of the high pass filter 81 makes it possible to detect a sudden voltage change. The absolute value circuit 82 outputs a positive output voltage when a direction of the sudden voltage change is not only positive but also negative. The comparator 83 compares an output of the absolute value circuit 82 with a predetermined reference value. An output of the abnormality determination unit 8 is provided to the CPU 9. Each circuit may be realized using any one of an analog circuit and a digital circuit.

The CPU 9 receives a determination result with respect to a magnitude relationship between the voltage of the DC link unit 4 and the predetermined reference value, i.e., an output result of the abnormality determination unit 8, and then outputs an alarm signal when the voltage of the DC link unit 4 exceeds the predetermined reference value.

The inverter 10 converts a DC voltage rectified by the DC link unit 4 into an AC voltage for driving a motor 13 using semiconductor switching elements 11a to 11f. The sign 11a represents an upper side switching element of a U phase and 11b represents a lower side switching element of the U phase. Further, 11c represents an upper side switching element of a V phase and 11d represents a lower side switching element of the V phase. Further, 11e represents an upper side switching element of a W phase and 11f represents a lower side switching element of the W phase. For the switching elements 11a to 11f, a transistor is usable. The switching elements 11a to 11f include flywheel diodes 12a to 12f connected in an antiparallel manner, respectively. The flywheel diode circulates current flowing by an electromotive force generated by electromagnetic induction of a coil in the motor 13 when a switching element is shifted from ON to OFF to inhibit occurrence of a high surge voltage for prevention of breakage of a transistor.

An AC voltage output from the inverter 10 is provided to the motor 13 to drive the motor 13.

Figure 4:
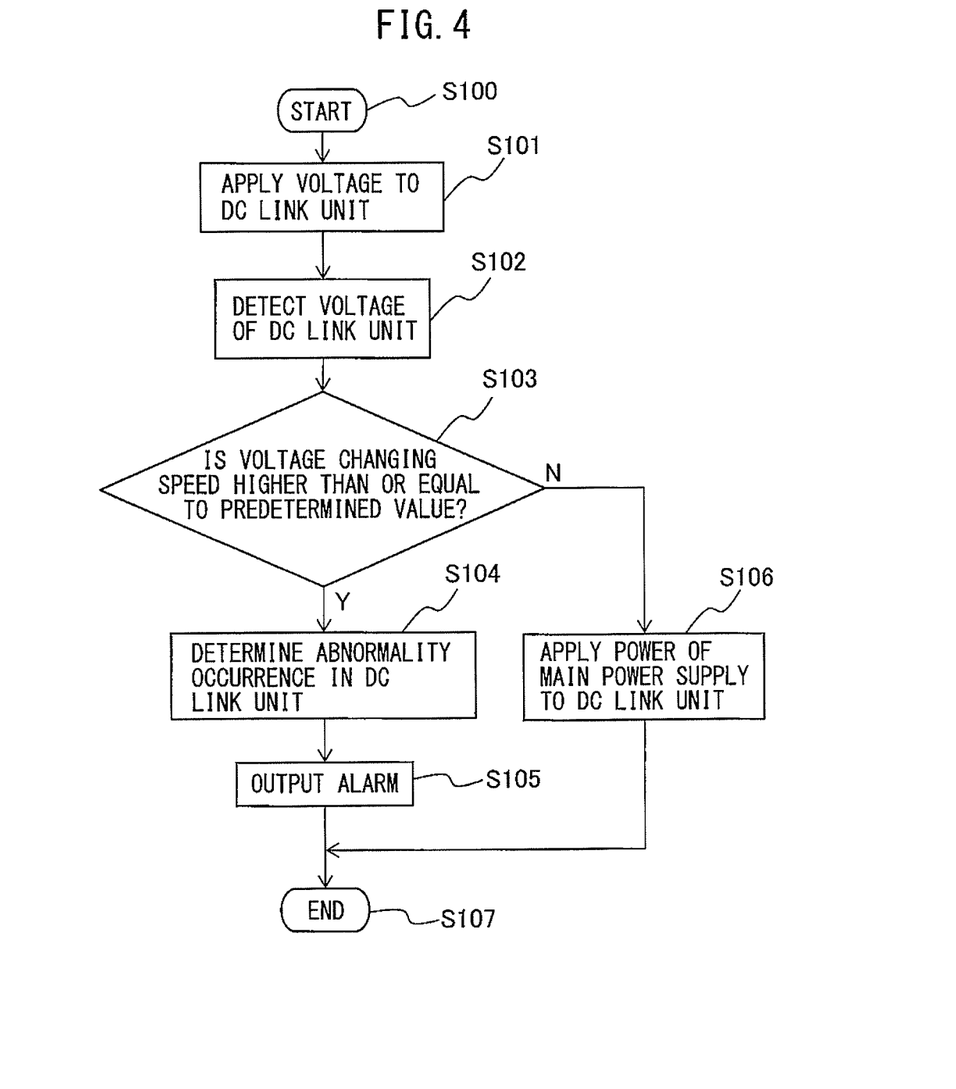
FIG. 4 is a flowchart for illustrating an operation of the motor drive device according to the first embodiment of the present invention.

Next, operation procedures of the motor drive device according to the first embodiment of the present invention will be described. FIG. 4 is a flowchart for illustrating operation procedures of the motor drive device according to the first embodiment of the present invention. In FIG. 4, to detect the presence or absence of an abnormality of the DC link unit 4, the main power supply side switch 3 is turned off and no AC power from the main power supply 1 is provided to the converter 2. Further, a voltage of both ends of the DC link unit 4 is previously set to be 0 (V).

In the present embodiment, the voltage detector 7 detects a voltage of the DC link unit 4 after application of a voltage by the voltage application unit 6 and then the abnormality determination unit 8 determines the presence or absence of an abnormality of the DC link unit 4 based on the voltage detected by the voltage detector 7. Specifically, the voltage detector 7 detects a voltage of the DC link unit 4 over a predetermined time, and the abnormality determination unit 8 determines the presence or absence of an abnormality of the DC link unit 4 based on a temporal change in the voltage of the DC link unit 4 detected by the voltage detector 7. Initially, in step S101, the voltage application unit 6 applies a voltage to the DC link unit 4. Specifically, as described above, the switch 61 of the voltage application unit 6 is turned on to apply a voltage of the DC power supply 62 to a part of the resistor 5 connected to the DC link unit 4.

Then, in step S102, the voltage detector 7 detects a voltage of the DC link unit 4 after application of the voltage by the voltage application unit 6. Specifically, as described above, a voltage of both ends of a part of the resistors configuring the resistor 5 connected to the DC link unit 4 is measured to calculate a voltage of the DC link unit 4. The voltage detector 7 detects the voltage of the DC link unit 4 over a predetermined time.

Figure 5:
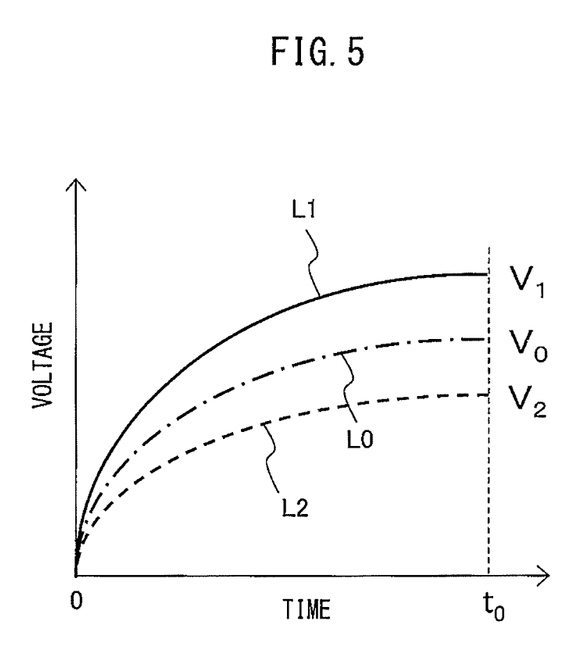
FIG. 5 is a graph illustrating temporal changes in voltages of both ends of a DC link unit.

Then, in step S103, the abnormality determination unit 8 determines whether a changing speed (temporal change) of the voltage detected by the voltage detector 7 is higher than or equal to a predetermined value. FIG. 5 illustrates one example of temporal changes in voltages of the DC link unit 4. FIG. 5 is a graph having the horizontal axis representing time and the vertical axis representing a voltage of the DC link unit. It is assumed that at a time t=0, the voltage application unit 6 started applying a voltage to the DC link unit 4. At that time, when the DC link unit 4 normally operates, a voltage of the DC link unit increases with time as illustrated as a curve L0, and then a voltage $V_0$ is assumed to be indicated at the time t=$t_0$. The voltage $V_0$ indicates a standard value (reference value) where the DC link unit 4 is determined to operate normally, and when a gap of a voltage V of the DC link unit 4 from the voltage $V_0$ is large, the DC link unit 4 is determined not to operate normally. In other words, the absolute value circuit 82 calculates an absolute value of a difference of the voltage V from the reference value $V_0$ at the time t=$t_0$, the comparator 83 compares the absolute value with a predetermined value, and the abnormality determination unit 8 determines the presence or absence of an abnormality of the DC link unit 4.

When, for example, the voltage of the DC link unit 4 detected by the voltage detector 7 changes as seen in a curve L1 of FIG. 5 and a voltage $V_1$ at the time t=$t_0$ exceeds $V_0$ with a difference higher than or equal to a predetermined value $\Delta V$ ($V_1$−$V_0$$\Delta V$), a determination that a sudden voltage change has occurred is made. On the other hand, when, for example, the voltage of the DC link unit 4 detected by the voltage detector 7 changes as seen in a curve L2 of FIG. 5 and a voltage $V_2$ at the time t=$t_0$ is less than $V_0$ with a difference higher than or equal to the predetermined value $\Delta V$ ($V_0$−$V_2$$\Delta V$), a determination that a sudden voltage change has occurred is made. In this manner, upon occurrence of a sudden voltage change, in step S104, an abnormality is determined to occur in the DC link unit 4. In this case, in step S105, the CPU 9 outputs an alarm.

On the other hand, with respect to the voltage of the DC link unit 4 detected by the voltage detector 7, when an absolute value of a difference between the voltage V at the time t=$t_0$ and the reference voltage $V_0$ is less than the predetermined value, no abnormality is determined to occur in the DC link unit 4, and in step S106, power of the main power supply 1 is applied to the DC link unit 4.

The above description has presented an example (a first abnormality detection method) for detecting the presence or absence of an abnormality of the DC link unit by comparing a voltage of the DC link unit 4 at a predetermined time with a reference value but the present invention is not limited thereto. The abnormality determination unit 8 may determine the presence or absence of an abnormality of the DC link unit 4 based on a temporal change rate of a voltage of the DC link unit 4. A method for measuring a temporal change rate includes a method (a second abnormality detection method) for calculating a temporal differential value of a voltage (dV/dt) at a predetermined time and a calculation method (a third abnormality detection method) in terms of an integrated time until a voltage of the DC link unit 4 reaches a predetermined voltage. Further, a combination of these plurality of abnormality detection methods may determine the presence or absence of an abnormality of the DC link unit 4. When, for example, an abnormality of the DC link unit 4 is detected using a combination of abnormality detection methods of three types including the first to third abnormality detection methods described above, an abnormality can be determined to occur in the DC link unit 4 upon satisfaction of a reference indicating the abnormality of the DC link unit 4 by any one of the abnormality detection methods. This manner makes it possible to quickly detect an abnormality of the DC link voltage.

Further, the abnormality determination unit 8 may determine the presence or absence of an abnormality of the DC link unit 4 based on a change amount of a voltage of the DC link unit 4. When, for example, a voltage of the DC link unit 4 is increased with time and the voltage of the DC link unit 4 is detected during a period from the time t=0 to t=$t_0$, and also the voltage of the DC link unit 4 largely differs from the predetermined reference value $V_0$ even before the time $t_0$, an abnormality may be determined to occur in the DC link unit 4 at that time. This manner makes it possible to quickly detect an abnormality of the DC link voltage.

Second Embodiment

Next, the motor drive device according to a second embodiment of the present invention will be described below. A configuration of the motor drive device according to the second embodiment is the same as that of the motor drive device according to the first embodiment illustrated in FIG. 2 and therefore, detailed description thereof will be omitted. As illustrated above, even upon no occurrence of an abnormality in the DC link unit, when there is a possibility that an abnormality occurs in the inverter, it is important to confirm no occurrence of an abnormality in the inverter before power of the main power supply is applied to the motor drive device. The motor drive device according to the second embodiment causes a semiconductor switching element to operate before power of the main power supply is applied to the DC link unit and detects a change in a voltage of the DC link unit to automatically detect an abnormality of the inverter, and has a feature of detecting the presence or absence of an abnormality of a switching element configuring the inverter from a change in a voltage of the DC link unit when the upper side switching element and the lower side switching element of each of the U, V, and W phases are sequentially turned on.

Figure 6:
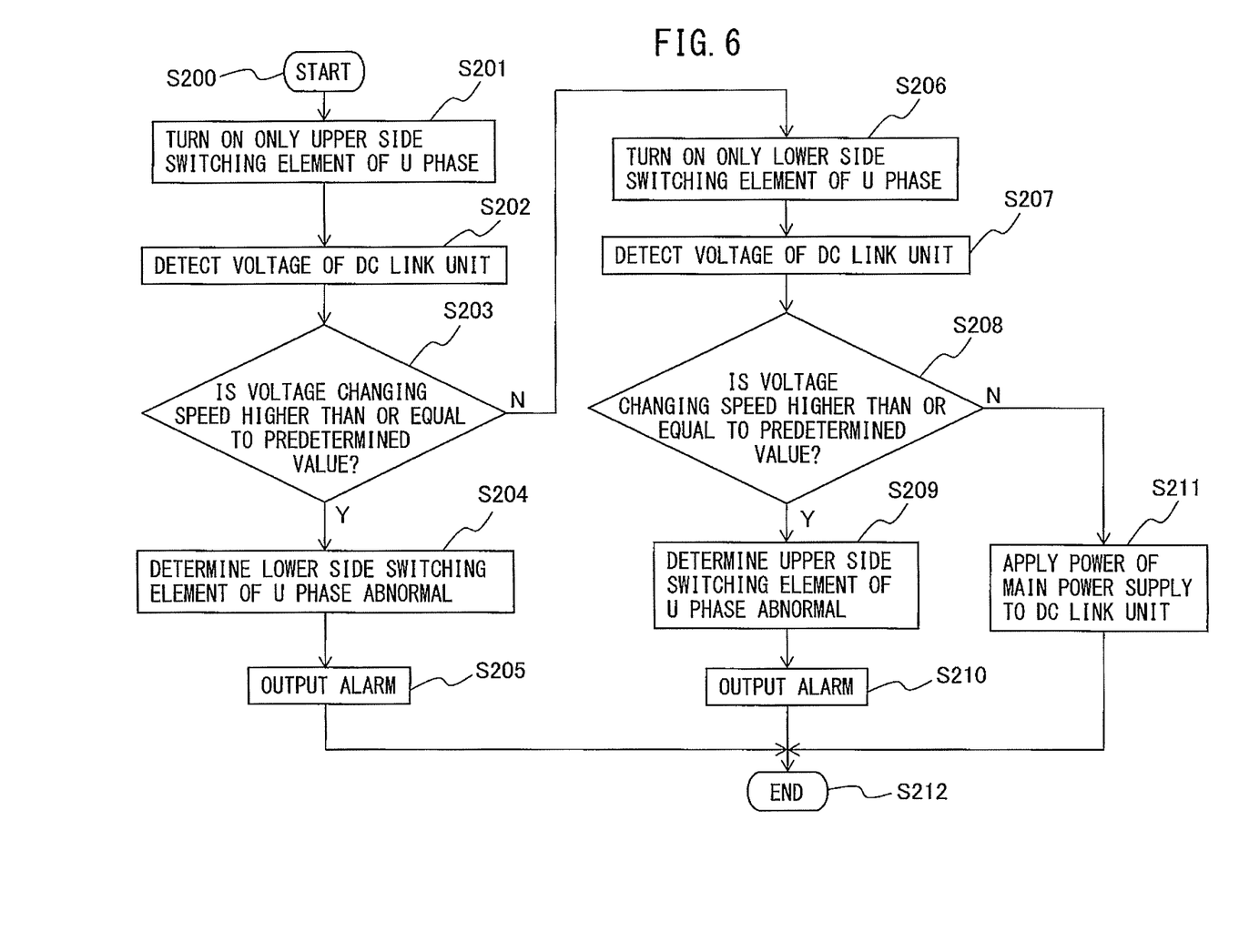
FIG. 6 is a flowchart for illustrating an operation of a motor drive device according to a second embodiment of the present invention.

Next, operation procedures of the motor drive device according to the second embodiment of the present invention will be described. FIG. 6 is a flowchart for illustrating operation procedures of the motor drive device according to the second embodiment of the present invention. Initially, in step S201, the switch 61 of the voltage application unit 6 is turned on and at the same time, only the upper side switching element 11*a* of the U phase is turned on based on a control signal from the CPU 9. At that time, the other switching elements 11*b* to 11*f* remain off. In the present embodiment, it is assumed that no abnormality has been confirmed to occur in the DC link unit 4.

Then, in step S202, the voltage detector 7 detects a voltage of the DC link unit 4 over a predetermined time. Then, in step S203, the abnormality determination unit 8 determines whether a changing speed of the voltage of the DC link unit 4 is higher than or equal to a predetermined value. The determination method for the voltage changing speed is the same as in the first embodiment and therefore, detailed description thereof will be omitted.

When the changing speed of the voltage of the DC link unit 4 is higher than or equal to the predetermined value, in step S204, an abnormality is determined to occur in the lower side switching element 11b of the U phase. In this case, in step S205, the CPU 9 outputs an alarm signal.

On the other hand, when the changing speed of the voltage of the DC link unit 4 is less than the predetermined value, in step S206, only the lower side switching element 11b of the U phase is turned on based on a control signal from the CPU 9.

Then, in step S207, the voltage detector 7 detects a voltage of the DC link unit 4 over a predetermined time. Then, in step S208, the abnormality determination unit 8 determines whether a changing speed of the voltage of the DC link unit 4 is higher than or equal to a predetermined value. The determination method for the voltage changing speed is the same as in the first embodiment and therefore, detailed description thereof will be omitted.

When the changing speed of the voltage of the DC link unit 4 is higher than or equal to the predetermined value, in step S209, an abnormality is determined to occur in the upper side switching element 11a of the U phase. In this case, in step S210, the CPU 9 outputs an alarm signal. On the other hand, when the changing speed of the voltage of the DC link unit 4 is less than the predetermined value, in step S211, power of the main power supply 1 is applied to the DC link unit. However, it is assumed that no abnormality occurs in the switching elements of the V phase and the W phase.

The above description has presented a detection method for the presence or absence of an abnormality of the upper side switching element and the lower side switching element of the U phase, and the same method is employable to detect the presence or absence of an abnormality of the switching elements of the V phase and the W phase. Detection of the presence or absence of an abnormality of the switching elements of the U phase, the V phase, and the W phase before application of power of the main power supply 1 to the motor drive device makes it possible to prevent breakage of a motor drive device, a power supply facility, and the like due to power activation even when an abnormality occurs in a switching element configuring the inverter.

Third Embodiment

Next, the motor drive device according to a third embodiment of the present invention will be described below. A configuration of the motor drive device according to the third embodiment is the same as that of the motor drive device according to the first embodiment illustrated in FIG. 2 and therefore, detailed description thereof will be omitted. As illustrated above, even upon no occurrence of an abnormality in the DC link unit, when there is a possibility that an abnormality occurs in the inverter, it is important to confirm no occurrence of an abnormality in the inverter before power of the main power supply 1 is applied to the motor drive device. The motor drive device according to the third embodiment causes a semiconductor switching element to operate before power of the main power supply 1 is applied to the DC link unit and detects a change in a voltage of the DC link unit to automatically detect an abnormality of the inverter, and has a feature of detecting the presence or absence of an abnormality such as interphase short circuit and the like in a switching element configuring the inverter from a change in a voltage of the DC link unit when the upper side switching element and the lower side switching element of two of the U phase, the V phase, and the W phase are turned on at the same time.

Figure 7:
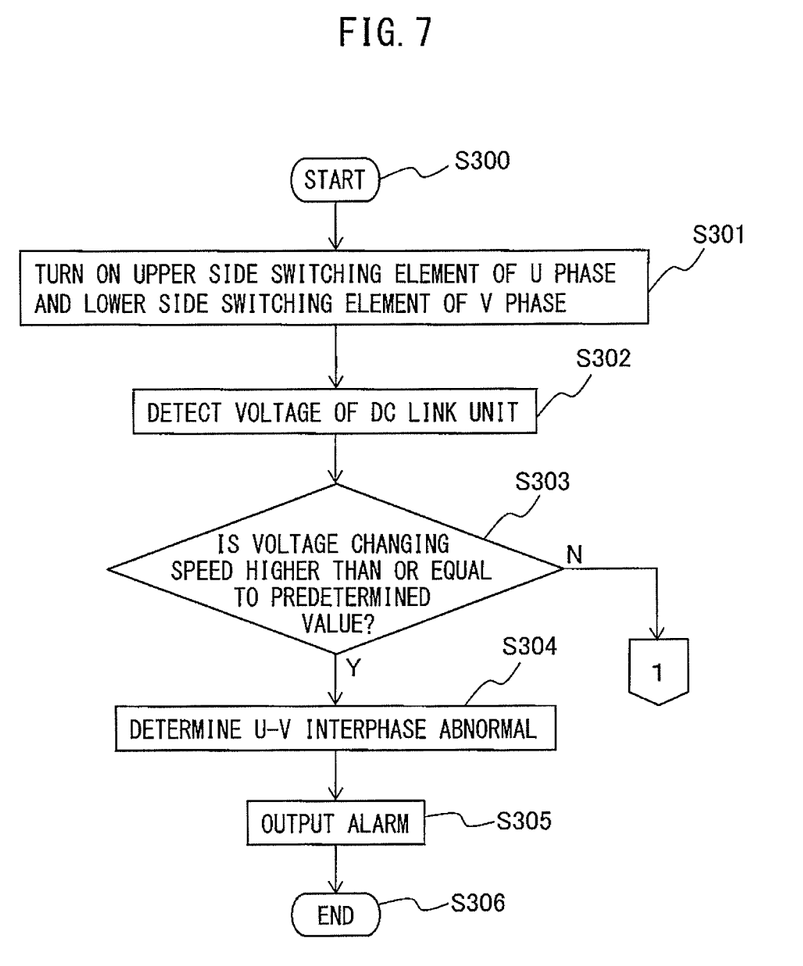
FIG. 7 is a flowchart for illustrating an operation of a motor drive device for detecting the presence or absence of an abnormality of the U-V interphase according to a third embodiment of the present invention.
Figure 8:
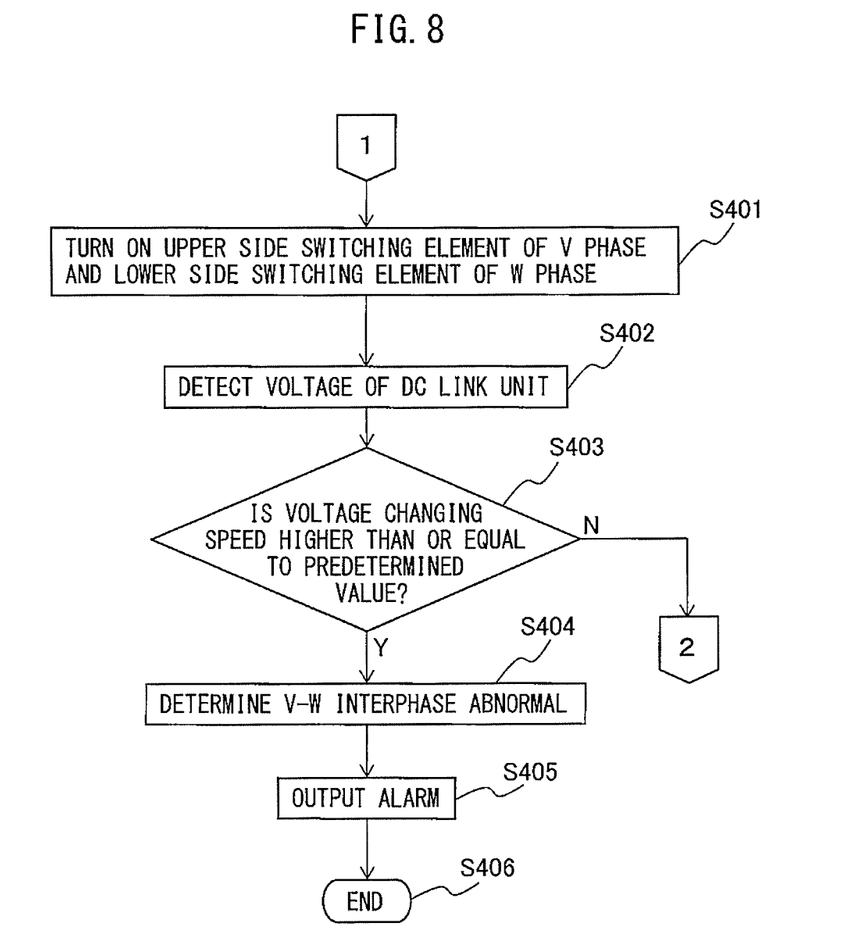
FIG. 8 is a flowchart for illustrating an operation of the motor drive device for detecting the presence or absence of an abnormality of the V-W interphase according to the third embodiment of the present invention.
Figure 9:
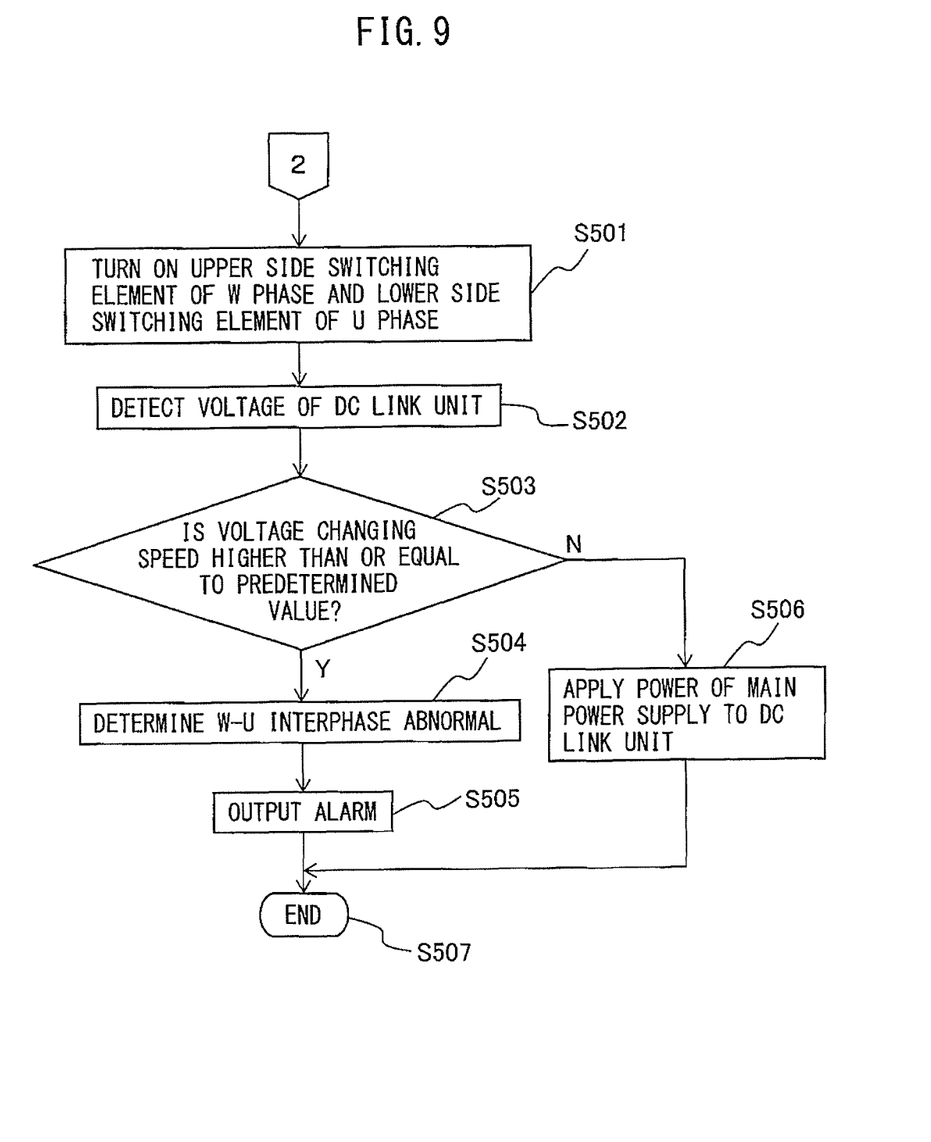
FIG. 9 is a flowchart for illustrating an operation of the motor drive device for detecting the presence or absence of an abnormality of the W-U interphase according to the third embodiment of the present invention.

Next, operation procedures of the motor drive device according to the third embodiment of the present invention will be described below. FIGS. 7 to 9 are flowcharts for illustrating operation procedures of the motor drive device according to the third embodiment of the present invention, and FIG. 7 is a flowchart for illustrating operation procedures of the motor drive device for detecting the presence or absence of an abnormality of the U-V interphase. Initially, in step S301, the switch 61 of the voltage application unit 6 is turned on and at the same time, the upper side switching element 11a of the U phase and the lower side switching element 11d of the V phase are turned on based on a control signal from the CPU 9. The other switching elements 11b, 11c, 11e, and 11f remain off. In the present embodiment, it is assumed that no abnormality has been confirmed to occur in the DC link unit 4.

Then, in step S302, the voltage detector 7 detects a voltage of the DC link unit 4 over a predetermined time. Then, in step S303, the abnormality determination unit 8 determines whether a changing speed of the voltage of the DC link unit 4 is higher than or equal to a predetermined value. The determination method for the voltage changing speed is the same as in the first embodiment and therefore, detailed description thereof will be omitted.

When the changing speed of the voltage of the DC link unit 4 is higher than or equal to the predetermined value, in step S304, an abnormality is determined to occur in the U-V interphase. In this case, in step S305, the CPU 9 outputs an alarm signal.

On the other hand, when the changing speed of the voltage of the DC link unit 4 is less than the predetermined value, the presence or absence of an abnormality of another interphase is detected. FIG. 8 is a flowchart for illustrating operation procedures of the motor drive device for detecting the presence or absence of an abnormality of the V-W interphase. Initially, in step S401, the switch 61 of the voltage application unit 6 is turned on and at the same time, the upper side switching element 11c of the V phase and the lower side switching element 11f of the W phase are turned on based on a control signal from the CPU 9. The other switching elements 11a, 11b, 11d, and 11e remain off.

Then, in step S402, the voltage detector 7 detects a voltage of the DC link unit 4 over a predetermined time. Then, in step S403, the abnormality determination unit 8 determines whether a changing speed of the voltage of the DC link unit 4 is higher than or equal to a predetermined value. The determination method for the voltage changing speed is the same as in the first embodiment and therefore, detailed description thereof will be omitted.

When the changing speed of the voltage of the DC link unit 4 is higher than or equal to the predetermined value, in step S404, an abnormality is determined to occur in the V-W interphase. In this case, in step S405, the CPU 9 outputs an alarm signal.

On the other hand, when the changing speed of the voltage of the DC link unit 4 is less than the predetermined value, the presence or absence of an abnormality of another interphase is detected. FIG. 9 is a flowchart for illustrating operation procedures of the motor drive device for detecting the presence or absence of an abnormality of the W-U interphase. Initially, in step S501, the switch 61 of the voltage application unit 6 is turned on and at the same time, the upper side switching element 11e of the W phase and the lower side switching element 11*b* of the U phase are turned on based on a control signal from the CPU 9. The other switching elements 11*a*, 11*c*, 11*d*, and 11*f* remain off.

Then, in step S502, the voltage detector 7 detects a voltage of the DC link unit 4 over a predetermined time. Then, in step S503, the abnormality determination unit 8 determines whether a changing speed of the voltage of the DC link unit 4 is higher than or equal to a predetermined value. The determination method for the voltage changing speed is the same as in the first embodiment and therefore, detailed description thereof will be omitted.

When the changing speed of the voltage of the DC link unit 4 is higher than or equal to the predetermined value, in step S504, an abnormality is determined to occur in the W-U interphase. In this case, in step S505, the CPU 9 outputs an alarm signal.

On the other hand, when the changing speed of the voltage of the DC link unit 4 is less than the predetermined value, no abnormality is confirmed to occur in the U-V interphase, the V-W interphase, and the W-U interphase, and therefore, power of the main power supply 1 is applied to the DC link unit 4.

As described above, detection of the presence or absence of an abnormality of the U-V interphase, the V-W interphase, and the W-U interphase before application of power of the main power supply to the motor drive device makes it possible to prevent breakage of a motor drive device, a power supply facility, and the like due to power activation even when an abnormality occurs in any interphase of the inverter 10.

The aforementioned detection of the presence or absence of an abnormality of the DC link unit and the inverter may be performed automatically by the control of the CPU 9 before power of the main power supply is applied to the motor drive device.

What is claimed is:

1. A motor drive device comprising:
   a converter for converting an AC voltage input from a main power supply into a DC voltage;
   a DC link unit for rectifying the DC voltage output by the converter;
   an inverter for converting the DC voltage rectified by the DC link unit into an AC voltage for driving a motor using a semiconductor switching element;
   a voltage application unit for applying a voltage to the DC link unit, the voltage application unit being disposed independently of the main power supply and being controlled by a CPU;
   a voltage detector for detecting a voltage of the DC link unit after application of the voltage by the voltage application unit; and
   an abnormality determination unit for determining a presence or absence of an abnormality of the DC link unit based on value of the voltage detected over a predetermined time by the voltage detector and a temporal change of the voltage and outputting a determination result to the CPU.

2. The motor drive device according to claim 1, wherein the abnormality determination unit comprises a comparator for comparing a voltage of the DC link unit with a predetermined reference value to compare the voltage of the DC link unit detected a predetermined time after the voltage application unit applies the voltage to the DC link unit with the predetermined reference value.

3. The motor drive device according to claim 1, wherein the voltage detector comprises an A/D converter for digitizing a voltage of the DC link unit to detect the voltage change by digital signal processing.

4. The motor drive device according to claim 1, wherein the semiconductor switching element is caused to operate before power of the main power supply is applied to the DC link unit and a change in a voltage of the DC link unit is detected, so that an abnormality of the inverter is automatically detected.

* * * * *